J. G. HODGSON & J. G. HODGSON, Jr.
DEMOUNTABLE VEHICLE RIM FOR RESILIENT TIRES.
APPLICATION FILED MAR. 17, 1910.
981,266.
Patented Jan. 10, 1911.
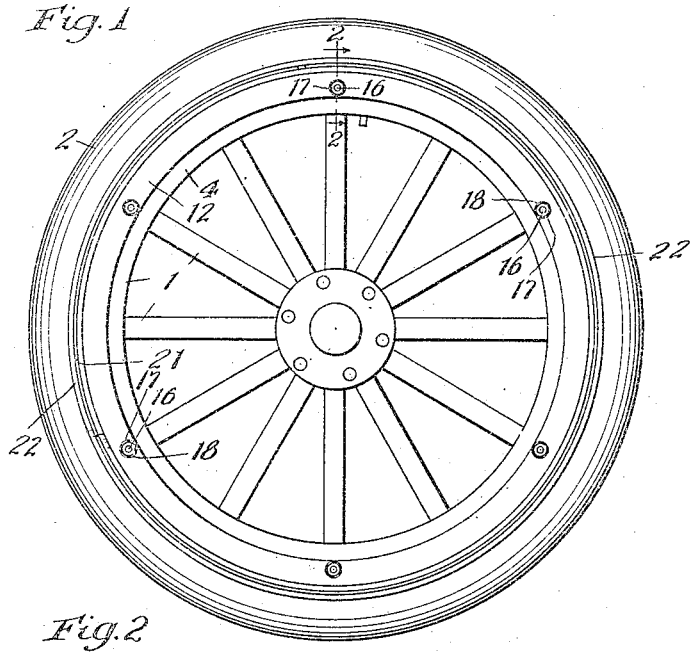
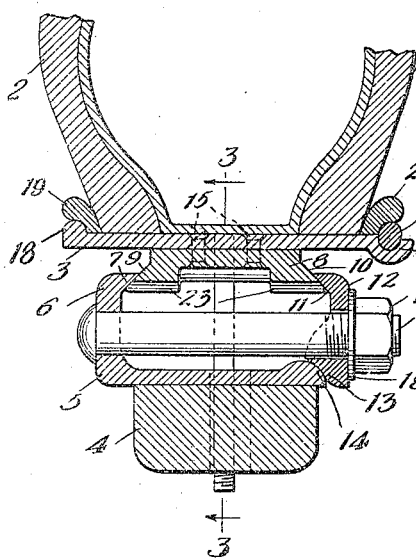
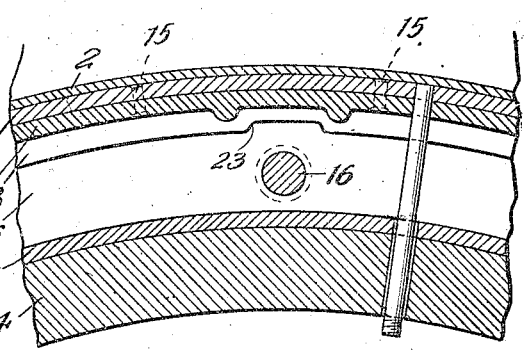
Witnesses
Inventors
John G. Hodgson
John G. Hodgson Jr.
By Munday, Evarts, Adcock & Clarke,
Attorneys

UNITED STATES PATENT OFFICE.

JOHN G. HODGSON AND JOHN G. HODGSON, JR., OF MAYWOOD, ILLINOIS.

DEMOUNTABLE VEHICLE-RIM FOR RESILIENT TIRES.

981,266. Specification of Letters Patent. Patented Jan. 10, 1911.

Application filed March 17, 1910. Serial No. 549,927.

To all whom it may concern:

Be it known that we, JOHN G. HODGSON and JOHN G. HODGSON, Jr., citizens of the United States, residing in Maywood, in the county of Cook and State of Illinois, have invented a new and useful Improvement in Demountable Vehicle-Rims for Resilient Tires, of which the following is a specification.

Our invention relates to improvements in demountable rims for resilient tired motor car or other vehicle wheels.

The object of the invention is to provide an improved construction of demountable resilient tire seating rims for motor car or other vehicle wheels, which will be strong, simple and durable, enable the tire and its seating rim to be quickly removed and replaced when required, and which at the same time will exert no outward or bursting pressure upon the tire seating rim.

Our invention consists in the means we employ to practically accomplish this object or result, as herein shown and described.

In the accompanying drawing forming a part of this specification, Figure 1 is a side elevation of a resilient tired motor car or other vehicle wheel having a demountable rim embodying our invention. Fig. 2 is an enlarged, partial cross section on line 2—2 of Fig. 1. Fig. 3 is a partial vertical section on line 3—3 of Fig. 2.

In the drawing, 1 represents a motor car or other vehicle wheel, 2 a resilient, preferably pneumatic, tire therefor, 3 the tire seating rim, 4 the felly of the wheel, 5 a metal band shrunk thereon in the usual manner and having at the inner side of the wheel a flange 6 furnished with an internal and outwardly projecting cone or annular wedge face 7.

8 is a ring member, preferably in a separate piece from the tire seating rim 3, and having at the inner side of the wheel a cone face 9 adapted to interengage with the cone face 7 of the flange 6, and on the outer side of the wheel a cone face 10 adapted to engage with the corresponding cone face 11 of the separate piece clamp ring 12. The clamp ring 12 is also provided with a beveled wedging or cone face 13, adapted to engage with the corresponding wedging or cone face 14 of the metal band 5. The ring 8, if it is made in a separate piece from the tire seating rim 3, is preferably secured thereto by rivets 15.

16 are clamp bolts extending preferably through the flange 6 of the band 5 and through the clamp ring 12, the same being furnished with a threaded nut 17 and washer 18.

By simply unscrewing the nuts 17, the tire and its seating rim 3 and attached ring 8 may be readily and very quickly removed and replaced with another. As the nuts 17 of the clamp bolt 16 are screwed home, the opposing cone or annular wedge faces 7, 11 on the band 5 and clamp ring 12 embrace and tend to draw inwardly between them the ring 8 of the tire seating rim 3, and thus, while very firmly and securely clamping and binding the parts together, exerting no outward or bursting strain whatever upon said tire seating rim 3 or its ring 8.

The wheel, resilient tire and the tire seating rim 3 may all be of any suitable, desired or known construction. By simply riveting the cone or annular wedge faced ring 8 onto a tire seating rim of any known construction, and applying to the felly of the wheel the metal band 5 with its flange 6 and cone or annular wedge face 7, the tire seating rim is made demountable through the agency of the clamp ring 12, the cone or annular wedge face 11 of which engages on the outer side the ring 8.

As illustrated in the drawing, the tire seating rim 3 is of a well known, quick, detachable side ring type, that is to say, provided on the inner side of the wheel with a flange 18 and side ring 19, and on the outer side of the wheel with a groove 20, detachable split ring 21 and side ring 22.

The ring 8 on the tire seating rim 3 is provided with notches or cut out portions 23 at the clamping bolt 16 to accommodate same and permit all the parts to be properly seated or forced home without interference from the clamp bolts.

In our invention, dirt is entirely excluded from between the tire seating rim and the metal band surrounding the felly of the wheel as the cone contacting faces of the interengaging rings form tight joints. And in our invention also, owing to the cone contacting faces of the interengaging rings, no difficulty is or can be experienced in separating the parts by reason of their becoming rusted.

We claim:—

1. In a demountable vehicle wheel rim, the combination with a metal band on the wheel, having on the inner side of the wheel an annular flange provided with a cone or annular wedge face, of a tire seating rim 3 having on its inner face a member furnished with two cone or annular wedge faces, and a clamp ring having a cone or annular wedge face, and means for clamping and holding together said flange and metal band and said clamp ring, said interengaging cone or annular wedge faces on said members operating to inwardly draw or bind the tire seating rim and exerting no outward or bursting pressure thereon, substantially as specified.

2. In a demountable vehicle wheel rim, the combination with a metal band on the wheel, having on the inner side of the wheel an annular flange provided with a cone or annular wedge face, of a tire seating rim 3 having on its inner face a member furnished with two cone or annular wedge faces, and a clamp ring having a cone or annular wedge face, said interengaging cone or annular wedge faces on said members operating to inwardly draw or bind the tire seating rim and exerting no outward or bursting pressure thereon, and clamp bolts extending through said clamp ring and the flange of said band, substantially as specified.

3. In a demountable vehicle wheel rim, the combination with a metal band on the wheel, having on the inner side of the wheel an annular flange provided with a cone or annular wedge face, of a tire seating rim 3 having on its inner face a member furnished with two cone or annular wedge faces, and a clamp ring having a cone or annular wedge face, and means for clamping and holding together said flange and metal band and said clamp ring, substantially as specified.

JOHN G. HODGSON.
JOHN G. HODGSON, Jr.

Witnesses:
PEARL ABRAMS,
H. M. MUNDAY.